(12) United States Patent
Bravo

(10) Patent No.: US 8,626,611 B2
(45) Date of Patent: Jan. 7, 2014

(54) METHOD AND APPARATUS FOR AUGMENTED REALITY SHOPPING ASSISTANT

(75) Inventor: Luis Eduardo Bravo, Norcross, GA (US)

(73) Assignee: NCR Corporation, Duluth, GA (US)

( * ) Notice: Subject to any disclaimer, the term of this patent is extended or adjusted under 35 U.S.C. 154(b) by 1155 days.

(21) Appl. No.: 12/008,433

(22) Filed: Jan. 11, 2008

(65) Prior Publication Data

US 2009/0182499 A1 Jul. 16, 2009

(51) Int. Cl.
*G01C 21/00* (2006.01)

(52) U.S. Cl.
USPC ... 705/26.9; 705/26.1; 705/26.42; 705/26.43; 705/26.8; 705/27.2; 345/419; 345/420; 345/621; 345/633; 345/335; 345/632; 235/380; 235/383; 235/375

(58) Field of Classification Search
USPC .......................................................... 701/207
See application file for complete search history.

(56) References Cited

U.S. PATENT DOCUMENTS

| 6,094,625 | A | 7/2000 | Ralston |
| 6,512,838 | B1 * | 1/2003 | Rafii et al. .................... 382/106 |
| 6,675,091 | B2 | 1/2004 | Navab |
| 2003/0080978 | A1 | 5/2003 | Navab et al. |
| 2004/0131232 | A1 | 7/2004 | Meisner et al. |
| 2004/0164926 | A1 | 8/2004 | Schonlau |
| 2007/0210155 | A1 | 9/2007 | Swartz et al. |
| 2008/0043013 | A1 * | 2/2008 | Gruttadauria et al. ........ 345/419 |
| 2008/0071559 | A1 * | 3/2008 | Arrasvuori ........................ 705/1 |

OTHER PUBLICATIONS

Volume holographic storage and retrieval of digital data, Science 265.5173 (Aug 5, 1994): 749.*

* cited by examiner

*Primary Examiner* — Ryan Zeender
*Assistant Examiner* — Fawaad Haider
(74) *Attorney, Agent, or Firm* — Paul Maginot; Harden E. Stevens, III

(57) ABSTRACT

An augmented reality shopping system in one embodiment includes a store communication network, a memory including program instructions for receiving a product location request, associating the received request with product information stored in a product database, determining the location of the product within the store, receiving shopper location information, determining a route between the determined location of the product and the shopper location based upon the shopper location information, generating route rendering data based upon the determined route, and transmitting the route rendering data through the store communication network. The system further includes a processor operably connected to the store communication network and to the memory for executing the program instructions and a mobile display device operably connected to the processor through the store communication network for rendering an overlay image using the transmitted route rendering data.

15 Claims, 7 Drawing Sheets

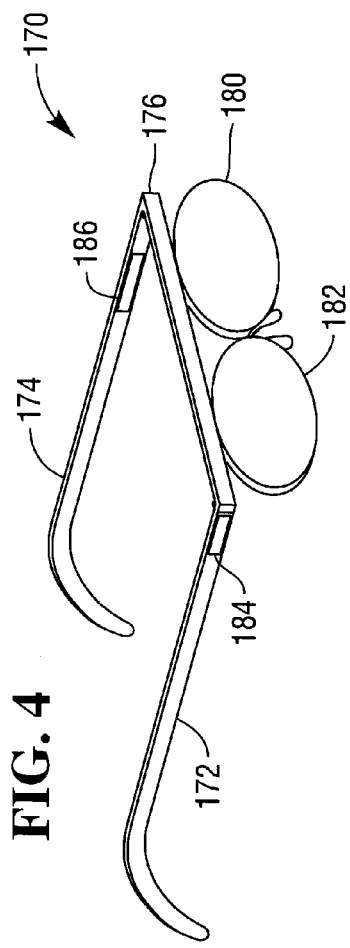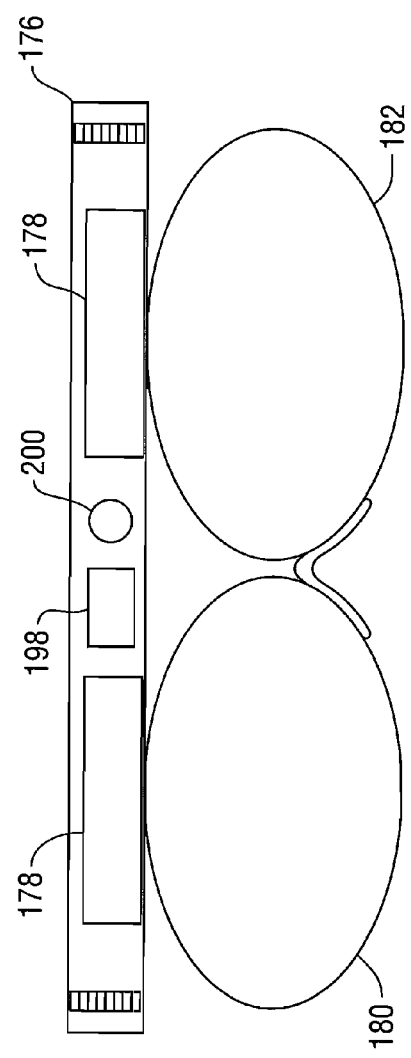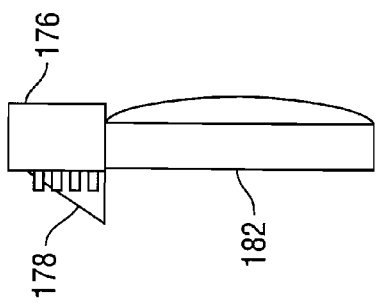

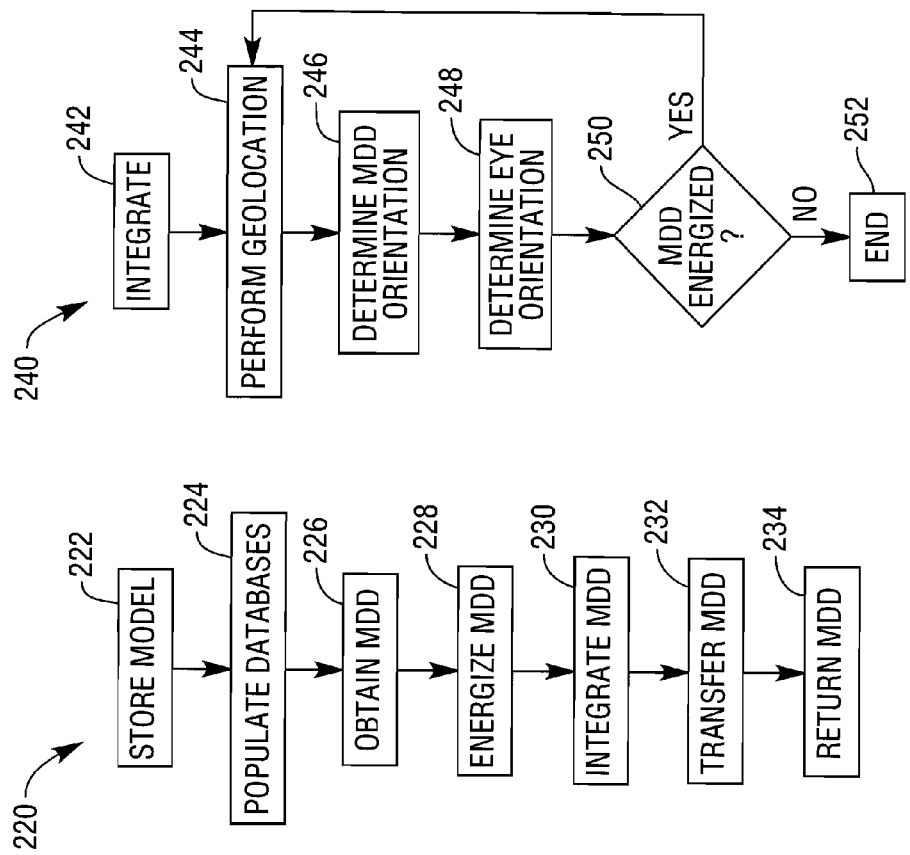
FIG. 11
FIG. 9
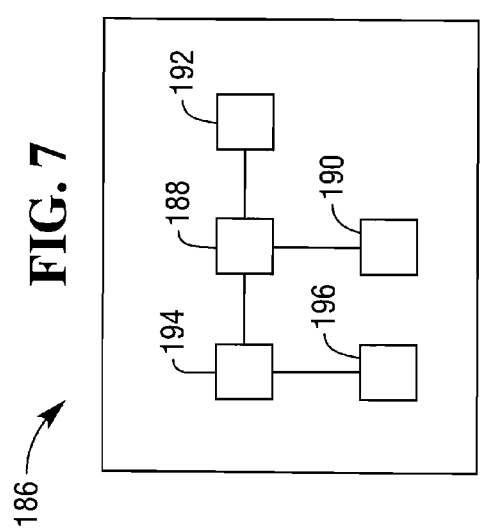
FIG. 7
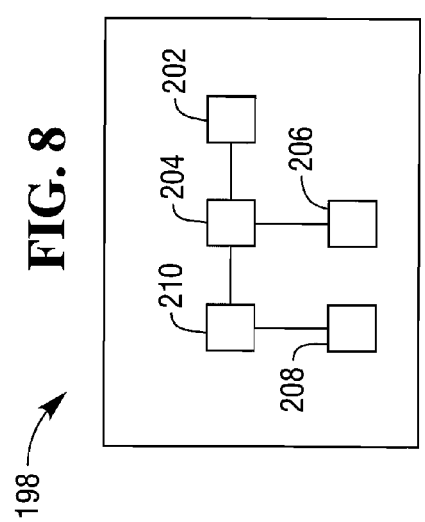
FIG. 8

METHOD AND APPARATUS FOR AUGMENTED REALITY SHOPPING ASSISTANT

FIELD OF THE INVENTION

The present invention relates generally to retail shopping systems, and more particularly, to methods and apparatus for assisting a shopper to locate products.

BACKGROUND OF THE INVENTION

Some shoppers enjoy hunting through a store in an effort to find a particular product. Shoppers who have only a vague idea of the desired product or who are looking for anything that inspires them may benefit from searching through the various products of a store.

Other shoppers, however, prefer to proceed directly to the product location. For example, the shopper may be on a tight schedule or the shopper may simply desire to minimize the shopping experience. In some instances, this type of shopper may be not overly familiar with the various products that a store offers. Moreover, the actual location of the products within the store may not be known. This leads to undesired extension of the shopping experience, particularly when the store offers a large number of products.

Additionally, many retail stores are continuously receiving and stocking new products. Accordingly, the particular location of an item within the store may change. A shopper looking for the product in a location of the store that was previously occupied by the product may thus be unable to find the product, even if the product is still available albeit at a different location within the store. While it is possible to ask a store employee for assistance in locating a product, some shoppers are averse to such interactions. Furthermore, the particular store employee may not be aware that the product has been moved.

What is needed is a system which automatically guides a shopper to the location of a desired product. What is further needed is a system that can accompany the shopper through the store to provide updated guidance. A further need exists for a system which can inform the shopper when a desired product is not available and suggest an alternative product which is available.

SUMMARY OF THE INVENTION

The present invention in one embodiment provides an augmented reality shopping system including a store communication network, a memory including program instructions for receiving a product location request, associating the received request with product information stored in a product database, determining the location of the product within the store, receiving shopper location information, determining a route between the determined location of the product and the shopper location based upon the shopper location information, generating route rendering data based upon the determined route, and transmitting the route rendering data through the store communication network. The system further includes a processor operably connected to the store communication network and to the memory for executing the program instructions and a mobile display device operably connected to the processor through the store communication network for rendering an overlay image using the transmitted route rendering data.

In a further embodiment, a method of rendering an overlay image includes receiving a product location request through a store communications network, associating the received request with product information stored in a product database, determining the location of the product within the store, receiving shopper location information, determining a route to the determined product location from a determined shopper location based upon the shopper location information, transmitting route rendering data through the store communication network and rendering an overlay image using the transmitted route rendering data on a mobile display device.

The above described features and advantages, as well as others, will become more readily apparent to those of ordinary skill in the art by reference to the following detailed description and accompanying drawings.

BRIEF DESCRIPTION OF THE DRAWINGS

FIG. 4 depicts an elevational perspective view of a mobile display device that may be integrated into the communication subsystem of FIG. 2 to overlay information onto the portion of a store viewed by an individual wearing the mobile display device in accordance with aspects of the invention;

FIG. 5 is a plan view of the rear of the mobile display device of FIG. 4 with the arms removed and depicting a projector, a communication module and a battery;

FIG. 6 is a plan view of the side of the mobile display device of FIG. 4 with the arms removed;

FIG. 7 is a block diagram of the sensor module of the mobile display device of FIG. 4 that may be used to provide data to the control system of FIG. 1;

FIG. 8 is a block diagram of the communications module of the mobile display device of FIG. 4 that may be used to provide data to and wireless connectivity with the control system of FIG. 1;

FIG. 9 is a flowchart of an exemplary overview of a manner of operation of one aspect of the subject invention;

FIG. 11 is a flowchart of an exemplary environment determination process which generates data indicative of the portion of the store viewed by a user through the mobile display device of FIG. 4 in accordance with principles of the invention;

DETAILED DESCRIPTION

Figure 1:
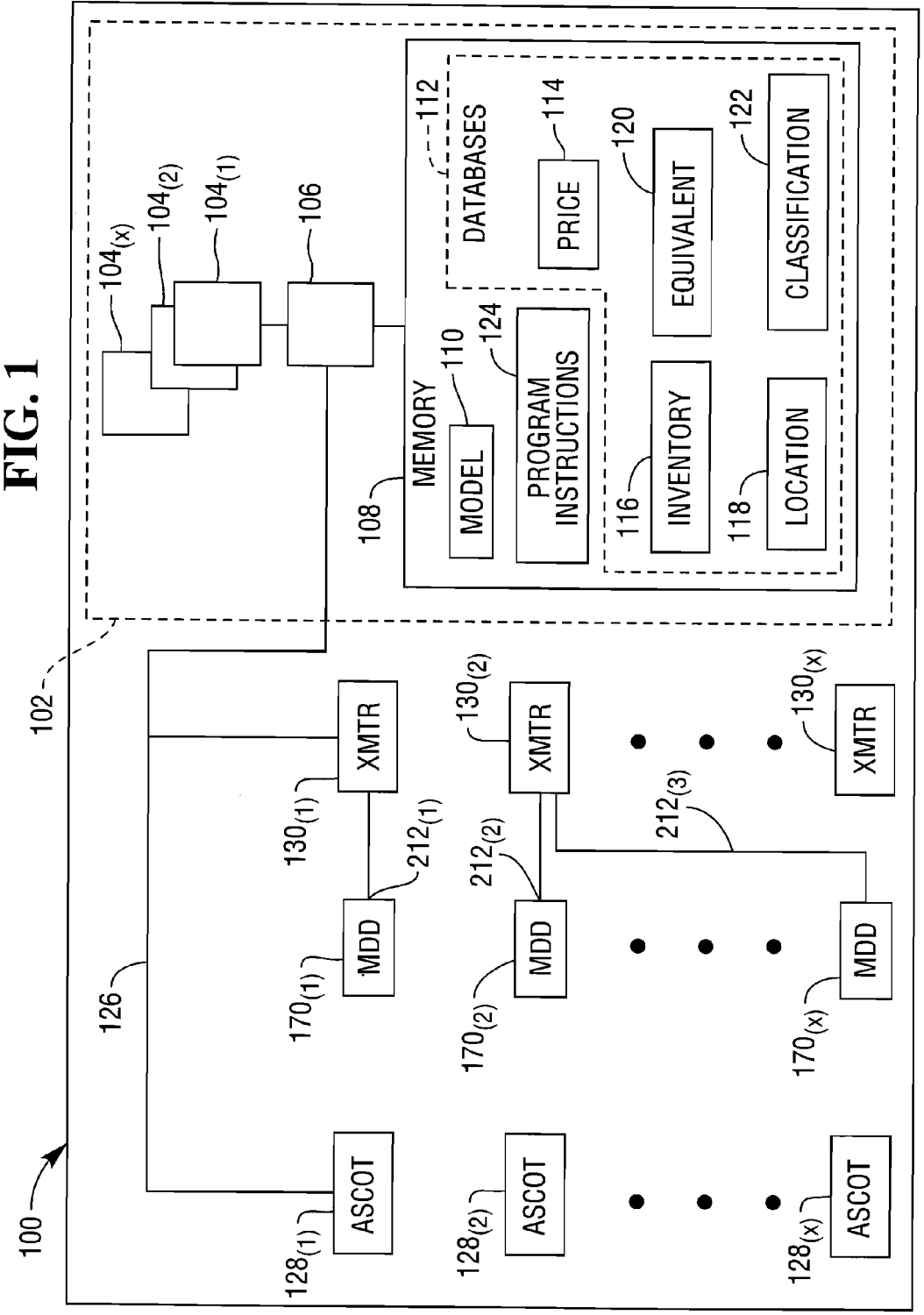
FIG. 1 is a block representation of a store with an exemplary embodiment of a control system in which the subject invention may be used.

Referring to FIG. 1, there is depicted a representation of a store or premises generally designated 100. Without being limiting, the store 100 may be any type of store that sells, rents, and/or leases merchandise. Typically the store 100 is of the type that sells merchandise such as a grocery store. Without being limiting, the subject invention will be described herein in the context of a grocery store selling merchandise of any and all types.

The store 100 has a control system 102 that includes I/O devices 104, a processing circuit 106 and a memory 108. The I/O devices 104 may include a user interface, graphical user interface, keyboards, pointing devices, remote and/or local communication links, displays, and other devices that allow externally generated information to be provided to the processing circuit 106, and that allow internal information of the control system 102 to be communicated externally.

The processing circuit 106 may suitably be a general purpose computer processing circuit such as a microprocessor and its associated circuitry. The processing circuit 106 is operable to carry out the operations attributed to it herein.

Within the memory 108 is a digital model 110 of the store 100. The model 110 is a collection of interrelated data objects representative of, or that correspond to, elements of the store 100. Elements of the store 100 may include floor plans, shelving units, displays, storage areas, etc. Databases 112 are also located within the memory 108.

The databases 112 include a price database 114, an inventory database 116, a location database 118, an equivalent database 120 and a classification database 122. In one embodiment, the databases are populated using object oriented modeling. The use of object oriented modeling allows for a rich description of the relationship between various objects. While shown within the store 100, the control system 104 and/or any one or more of the databases 112 may be remote from the store 100.

Program instructions 124 are also included in the memory 108. The program instructions 124, which are described more fully below, are executable by the processing circuit 106 and/or any other components as appropriate.

A communications network 126 provides communications between the control system 102 a plurality of assisted/self check-out terminals (ASCOTs) 128, and a number of transmitters 130 positioned throughout the store 100. In the embodiment described herein, the communications network 126 is a wireless communication scheme implemented as a wireless area network. A wireless communication scheme identifies the specific protocols and RF frequency plan employed in wireless communications between sets of wireless devices. To this end, the processing circuit 106 employs a packet-hopping wireless protocol to effect communication by and among the processing circuit 106, the ASCOTs 128 and the transmitters 130.

Figure 2:
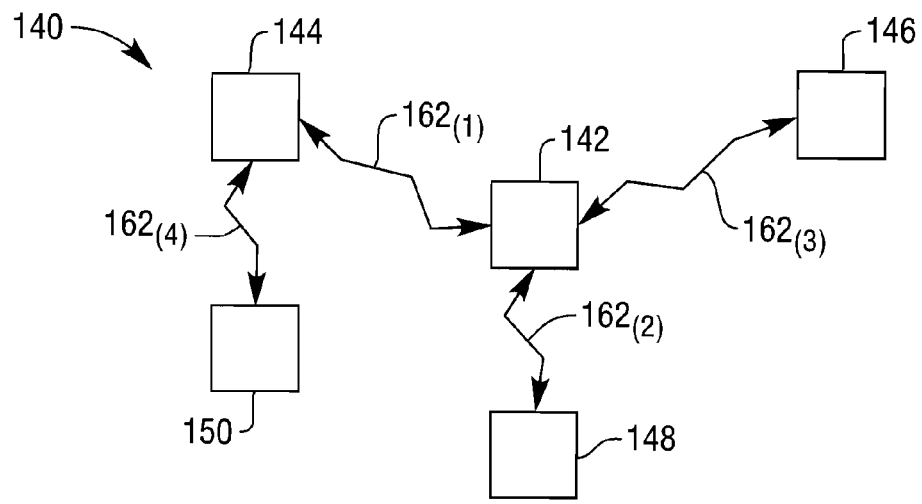
FIG. 2 is a block representation of an exemplary communication subsystem in the form of a piconet which is formed by the transmitters of FIG. 1.

The transmitters 130 may be self-configuring and self-commissioning. Accordingly, when the transmitters 130 are placed within communication range of each other, they will form a piconet as is known in the relevant art. In the case that a transmitter 130 is placed within range of an existent piconet, the transmitters 130 will join the existent piconet. Accordingly, the transmitters 130 are formed into one or more communication subsystems 140 as shown in FIG. 2. The transmitters 130 within the communication subsystem 140 include a hub transmitter 142, and slave transmitters 144, 146 and 148. Additionally, a slave transmitter 150 is within the communication subsystem 140 as a slave to the slave transmitter 144. It will be appreciated that a particular communication subsystem 140 may contain more or fewer transmitters 130 than the transmitters 130 shown in FIG. 2.

Figure 3:
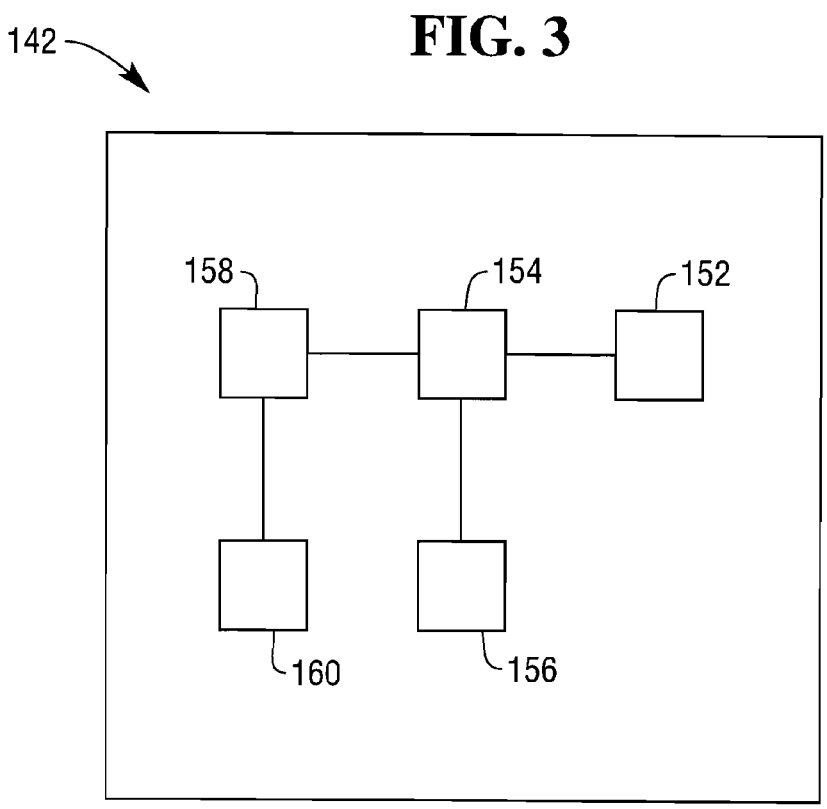
FIG. 3 is a block diagram of the components of the transmitter of FIG. 1.

In the exemplary embodiment described herein, the communication subsystem 140 is operable to assist in transmitting and receiving information between a user and the control system 102. To accomplish these and other functions, the hub transmitter 142, shown in FIG. 3, includes a network interface 152, a hub processor 154, a non-volatile memory 156, a signal processing circuit 158, and a micro-electrical mechanical system (MEMS) local RF communication circuit 160.

The network interface 152 is a communication circuit that effectuates communication to one or more components of the communications network 126. To allow for wireless communication with the other components of the communications network 126, the network interface 152 is preferably a radio frequency (RF) modem configured to communicate using the wireless area network communication scheme. Thus, each of the transmitters 130 may communicate with components such as other communication subsystems, the ASCOTs 128 and the processing circuit 106. In the communication subsystem 140, the hub transmitter 142 uses the network interface 152 to link with the communications network 126 as well as to establish piconet links $162_{(1-3)}$ (see FIG. 2) with the network interfaces 152 of the slave transmitters 144, 146 and 148. The network interfaces 152 of the slave transmitters 144 and 150 also establish a piconet link $162_{(4)}$.

The network interface 152 is further operable to, either alone or in conjunction with the hub processor 154, interpret messages in wireless communications received from external devices and determine whether the messages should be retransmitted to another external device, or processed by the hub transmitter 142. Preferably, the network interface 152 employs a packet-hopping protocol to reduce the overall transmission power required. In packet-hopping, each message may be transmitted through multiple intermediate communication subsystem interfaces before it reaches its destination as is known in the relevant art.

The MEMS local RF communication circuit 160 may suitably include a Bluetooth RF modem, or some other type of short range (about 30-100 feet) RF communication modem. The use of a MEMS-based RF communication circuit allows for reduced power consumption, thereby enabling the hub transmitter 142 to be battery operated, if desired. The life of the hub transmitter 142 may be extended using power management approaches. Additionally, the battery may be augmented or even replaced by incorporating structure within the MEMS module to use or convert energy in the form of vibrations or ambient light.

The hub processor 154 is a processing circuit operable to control the general operation of the hub transmitter 142. In addition, the hub processor 154 may implement control functions and information gathering functions used to maintain the databases 112. For example, the hub processor 154 may obtain data from RFID tags located within the range of the communication subsystem 140 and forward RFID tag information to the processing circuit 106.

Returning to FIG. 1, a number of mobile display devices (MDDs) 170 are also provided within the store 100. One MDD 170 is depicted in FIG. 4. The MDD 170 in this embodiment is a hands-free display unit. The MDD 170 includes two arms 172 and 174 joined by a support rim 176. A dual projector 178 (shown in FIGS. 5 and 6) is positioned to project an image onto lenses 180 and 182. The lenses 180 and 182 are substantially clear. The projector 178 and lenses 180 and 182 are configured to render an image that appears as an overlay of objects seen by a user through the lenses 180 and 182. One such system is described in U.S. Patent Application Publication 2004/0164926 A1 dated Aug. 26, 2004, the contents of which are herein incorporated by reference. A microphone 184 is imbedded within the arm 172 to capture audio commands from the user. A sensor module 186 is embedded within the arm 174.

The sensor module 186 includes a microcontroller 188, a programmable non-volatile memory 190, a communication circuit 192, a signal processing circuit 194 and a MEMS sensor suite 196 as shown in FIG. 7. The signal processing circuit 194 includes the circuitry that interfaces with the sensor suite 196, converts analog sensor signals to digital signals, and provides the digital signals to the microcontroller 188.

The programmable non-volatile memory 190, which may be embodied as a flash programmable EEPROM, stores configuration information for the sensor suite 196. The programmable non-volatile memory 190 includes an "address" or "ID" of the sensor module 186 that is appended to any communications generated by the sensor module 186. The memory 190 further includes set-up configuration information related to the system communication parameters employed by the microcontroller 188 and/or communication circuit 192 to transmit information to other devices.

The microcontroller 188 is a processing circuit operable to control the general operation of the sensor module 186. The sensor suite 196 in this embodiment is configured as a 3-axis gyroscope to provide information as to the orientation of the MDD 170. In general, the microcontroller 188 receives digital sensor information from the signal processing circuit 194 and provides the information to the local communication circuit 192 for transmission. The microcontroller 188 is further operable to receive configuration information via the communication circuit 192, store configuration information in the memory 190, and perform operations in accordance with such configuration information.

The communication circuit 192 is operably connected to a communications module 198 located in the support rim 176 along with a battery 200 that provides power for the MDD 170. The communications module 198, as shown in FIG. 8, includes a MEMS local RF communication circuit 202, a microcontroller 204, a programmable non-volatile memory 206, a MEMS sensor suite 208 and a signal processing circuit 210, all of which function generally in a manner similar to the similarly named components discussed above with respect to FIGS. 3 and 7. The MEMS sensor suite 208 in this embodiment is configured as a camera to track the eye movement of the individual wearing the mobile device. Accordingly, the individual may interface with the device using both voice commands and eye movement. A system for eye tracking and speech recognition that may be used in such an embodiment is disclosed in U.S. Pat. No. 6,853,972 B2, issued on Feb. 8, 2005 to Friedrich et al., which is herein incorporated by reference.

Referring to FIG. 9, there is depicted a flowchart, generally designated 220, setting forth an exemplary manner of operation of the system according to the present principles. Initially, a digital model 110 of the store 100 may be stored within the memory 108 at the step 222. The digital model 110 preferably identifies the floor plan of the store 100 along with the location of shelves and mobile displays. In one embodiment, the digital model 110 is a three dimensional model. Maintenance of the digital model 110 may be automated. For example, store fixtures may be equipped with identification devices, active or passive, which can be used to track the location of the fixture within the store 100 using the communications network 126.

Next, in step 224, the databases 112 are populated. By way of example the inventory database 116 may be populated with product identification data along with data identifying the current number of each product available within the store. The inventory database 116 may be updated with information from a store receiving station for incoming product as well as information as to product sold which is obtained from the ASCOT 128. The executable commands for maintenance of the inventory database 116 are stored as program instructions 124.

The location database 118 may likewise be populated and maintained using any desired data input process. In one embodiment, a product includes a radio frequency identification tag (RFID tag) which identifies the particular product. When the location of the product is changed, an RFID tag reader is used to read the RFID tag at the new location. Product information, including location information, is then transmitted through the communications network 126 to the processing circuit 106. The RFID tag reader may be located in the shelving of the store or a portable reader may be used. The executable commands for maintenance of the location database 118 are stored as program instructions 124.

The equivalent database 120 may also be populated and maintained using any desired data input process. For each predetermined product, one or more alternative products are identified. The alternative product may be a product for which the merchant has a more favorable margin or a generic equivalent of a brand name. Alternative products may be identified for products which are normally stocked or for products which are not carried in inventory. The executable commands for maintenance of the equivalent database 120 are stored as program instructions 124.

The classification database 122 may be populated and maintained using any desired data input process. The classification database 122 may be used to associate different products with common characteristics. For example, products with low sugar content or low carbohydrate content may be associated. Similarly, products which do not include certain ingredients or which are provided by the same manufacturer may be associated. The executable commands for maintenance of the classification database 122 are stored as program instructions 124.

Returning to FIG. 9, at step 226 a user obtains a MDD 170. The MDDs 170 may be available for use at the entrance of the store. In one embodiment, a credit card may be used to checkout an MDD from an automated display device. The automated display device (not shown) may be used to recharge the battery 200. The MDD 170 may be configured to automatically energize when removed from the display. Alternatively, an energization switch may be provided. Upon energization of the MDD 170 at step 228, the microcontroller 204 causes the MEMS local RF communication circuit 202 to emit a signal which is detected by one or more transmitters 130. At the step 230, the MDD 170 is then integrated into a communication subsystem 140 through a temporary piconet link 212 (see FIG. 1) as a slave device through a transmitter 130. The transmitter 130 may be a slave transmitter or a hub transmitter.

Figure 10:
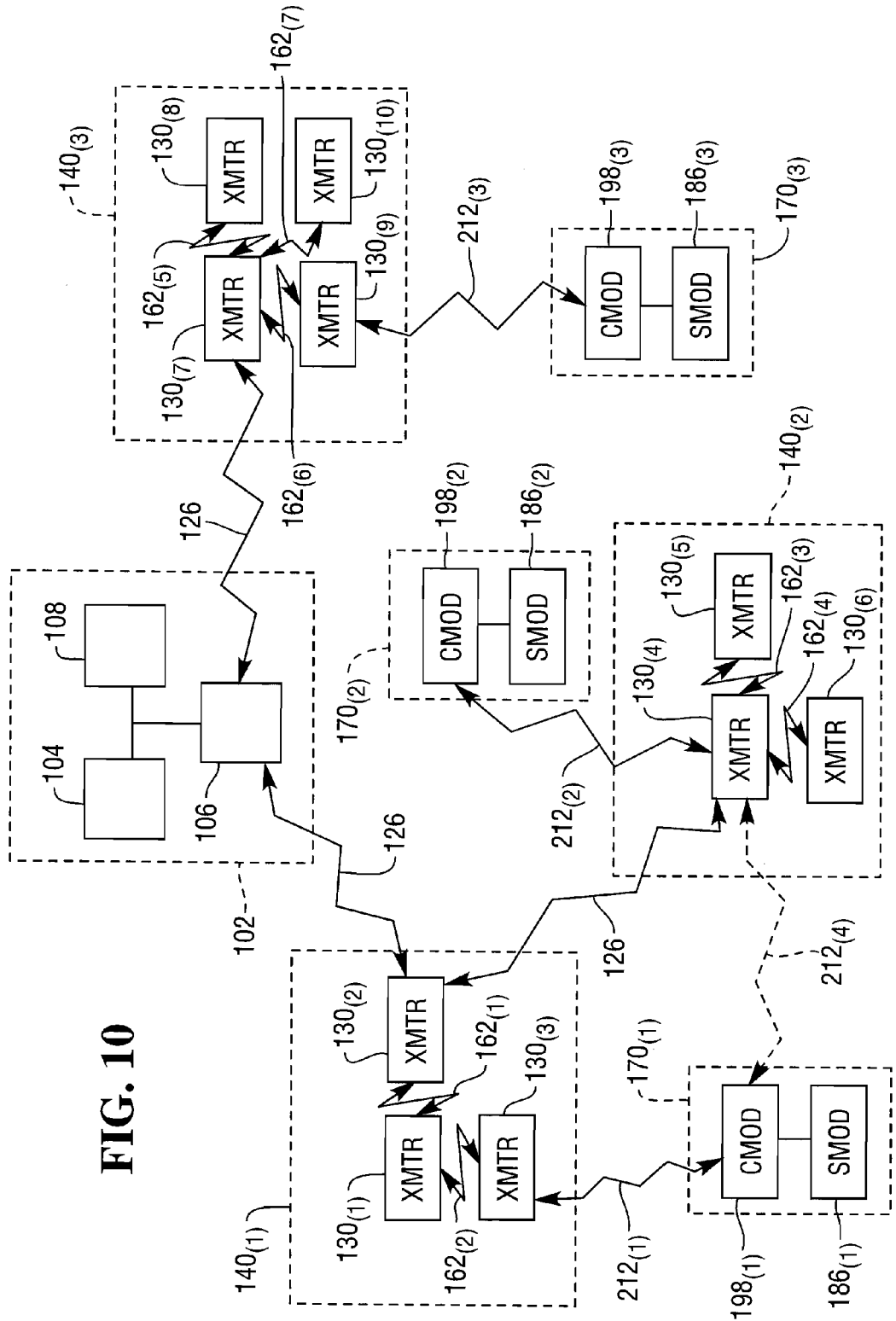
FIG. 10 is a schematic of various data paths between transmitters, mobile display devices and the control system of FIG. 1 in accordance with aspects of the invention.

Once the MDD 170 is integrated into a communication subsystem 140, information may be passed between the MDD 170 and the control system 102 through the communication network 126. By way of example, FIG. 10 depicts communication subsystems $140_{(1-3)}$ which are connected to the control system 102 through communication network 126. In the configuration of FIG. 10, transmitter $130_{(2)}$, transmitter $130_{(4)}$ and transmitter $130_{(7)}$ are configured as hub transmitters with the communication subsystem $140_{(2)}$ connected to the control system 102 through the communication subsystem $140_{(1)}$.

Each of the communication subsystems $140_{(1-3)}$ in the embodiment of FIG. 10 include multiple transmitters 130 linked with piconet links 162. Additionally, MDDs $170_{(1-3)}$ are each linked to communication subsystems $140_{(1-3)}$, respectively, through a respect temporary piconet link $212_{(1-3)}$. Thus, data may be passed back and forth between an MDD 170 and the processing circuit 106.

Continuing with the process 220, as the user moves within the store, the MDD 170 may move in and out of range of various transmitters 130. In response, communications control over the MDD 170 is automatically removed from a given transmitter 130 and transferred to another transmitter 130 at step 232. The various transmitters may be within a common communication subsystem or they may be integrated into separate communication subsystems. By way of example, as the MDD $170_{(1)}$ moves closer to the communication subsystem $140_{(2)}$ of FIG. 10, the temporary piconet link $212_{(4)}$ is established between the MDD $170_{(1)}$ and the communication subsystem $140_{(2)}$. This allows the temporary piconet link $212_{(1)}$ to be terminated.

Returning to the process 220, when the user is done using the MDD 170, the MDD 170 is returned to the display (not shown) or other location at step 234 and made ready for the next user. Updates to the databases 112 and/or the model 110 may occur at any time as established by the program instructions 124.

When the MDD 170 is being worn by a user, the location and orientation of the MDD 170 may be determined. In FIG. 11, an environment determination process 240 commences with the integration of a MDD 170 into a communications subsystem 140 at step 242 in the manner set forth above. The process 240 may be executed on an "as needed" basis. Alternatively, the process 240 may be executed at a constant periodicity. Next, the hub transmitter 142 of the communication subsystem 140 into which the MDD 170 has been integrated automatically performs a geolocation process at step 244. To this end, the newly integrated MDD 170 may be commanded to transmit a signal. The transmitted signal is received by the slave transmitters 144, 146, 148, 150 and the hub transmitter 142 in the piconet and time-stamped. Because the location of the transmitters 130 is known, the position of the newly integrated MDD 170 may be determined by triangulation by comparing the time at which the transmitted signal was received by various transmitters 130.

Alternatively, the slave transmitters 144, 146, 148 and 150 may transmit signals at predetermined times. By comparing the time at which the newly integrated MDD 170 receives the transmitted signals, the position of the newly integrated MDD 170 may be determined by triangulation. In a further embodiment, a portable geographic position determining device may be incorporated into the MDD 170. The geographic position determining device may then be temporarily integrated into the piconet to transmit the geolocation data to the hub transmitter 142.

In any event, once the location data is available, the location data of the MDD 170 is forwarded to the processing circuit 106. Additionally, the orientation of the MDD 170 may be obtained by polling the sensor module 186 at step 246 and transmitting the orientation data from the sensor module 186 to the processing circuit 106. Likewise, the sensor suite 208 may be polled for data indicative of the positioning of the eyes of the user at the step 248 and the eye position data transmitted to the processing circuit 106. If the MDD 170 is still energized at step 250, then the process returns to performance of a geolocation of the MDD 170 at the step 244. If the MDD 170 is no longer energized, the process ends at step 252.

Figure 12:
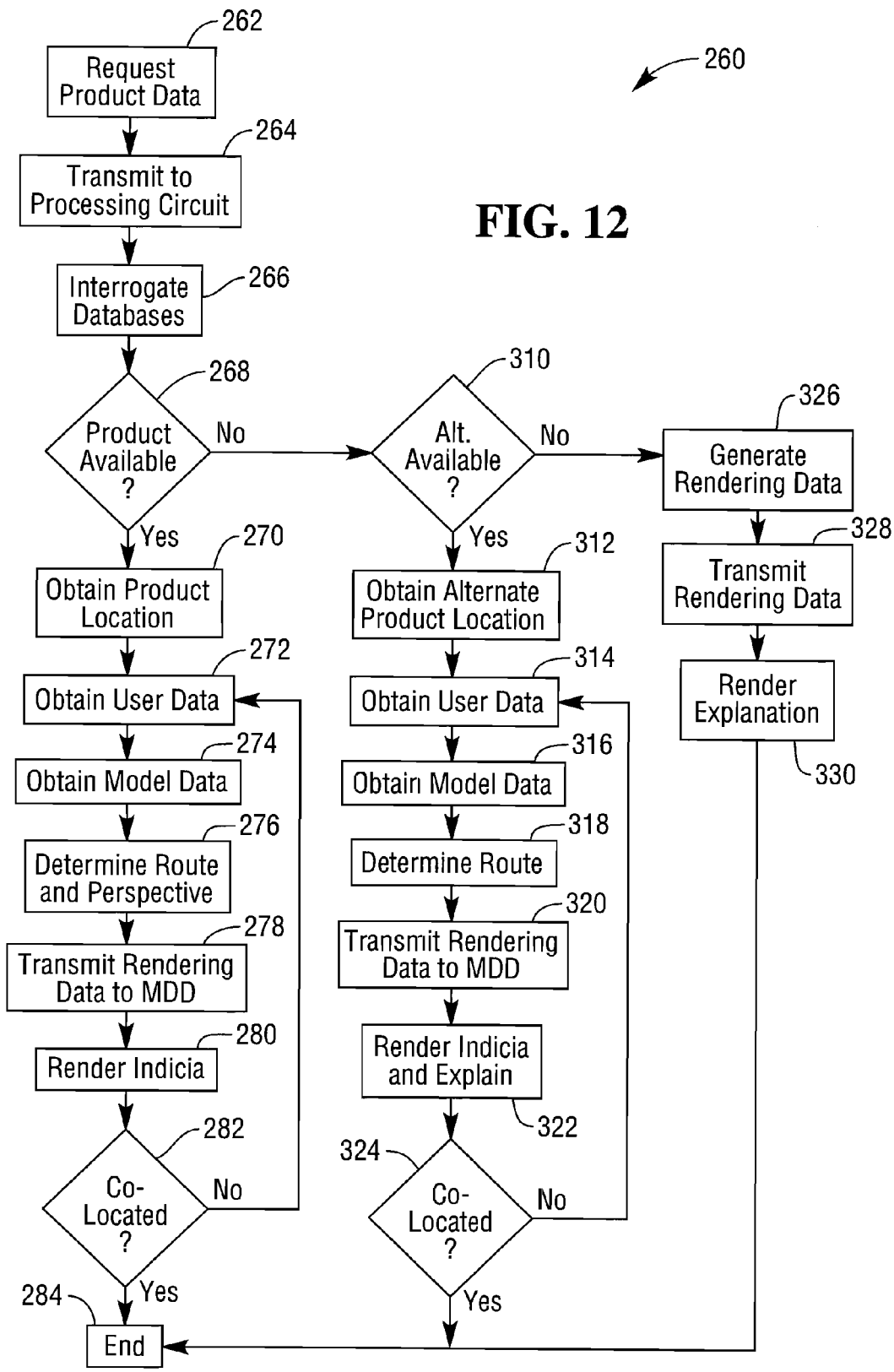
FIG. 12 is a flowchart of an exemplary manner of using the mobile display device of FIG. 4 which is integrated into the communication subsystem of FIG. 2 to provide a user with an augmented reality view of the store of FIG. 1 in accordance with principles of the invention.

The system described above allows for a variety of data to be provided to a user to assist the user when the user is wearing a MDD 170. An example of the operation of the system in response to a user request is described with reference to the process 260 of FIG. 12. After the process of FIG. 9 has been executed through step 230 and the MDD 170 is integrated into a communication subsystem 140, the user wearing the MDD 170 may issue a voice command requesting product data at the step 262. For example, the user may say "show me dog biscuits." The voice command is detected by the microphone 184 in the MDD 170 and analyzed using voice recognition software stored in the memory 206 of the communications module 198. An alternative user interface, such as a keypad, may be used in addition to or in place of the microphone 184.

At step 264, the microcontroller 204 controls the local RF communication circuit 202 of the communications module 198 to transmit the product data request to the hub transmitter 142 of the communication subsystem 140 which forwards the request to the processing circuit 106 through the communications network 126. The processing circuit 106 executes program instructions 124 at step 266 which cause the inventory database 114 to be searched to ascertain the availability of the product identified by the user. At step 268, the processing circuit determines whether or not the requested product is available. If the product is available, then at step 270 the processing circuit 106 executes program instructions 124 which cause the location database 118 to be searched to ascertain the location of the product identified by the user. The location data may be provided in two dimensional coordinates or in three dimensional coordinates.

Next, the processing circuit 106 obtains user data at step 272. The user data includes the location and orientation of the MDD 170 obtained in the process 240. The user data may further include the eye orientation data obtained in process 240. If the system is limited to two dimensional coordinates, then eye orientation data is not necessary. Additionally, when using two dimensional coordinates, MDD orientation data need only be provided to the extent necessary to ascertain the direction the user is looking.

At step 274, the processing circuit 106 obtains model data from the stored model 110. The entire model 110 need not be obtained. Rather, only the portion of the model between and including the product location and the location of the user is needed. Using the data obtained in steps 270, 272 and 274, the processing circuit 106 at step 276 determines the best route from the user location to the product location. Additionally, the perspective of the user is determined based upon the user data from step 272. Based upon the determined route and perspective data, the processing circuit 106 generates indicia rendering data which may be used to render the indicia onto the lenses 180 and 182 and transmits the rendering data for the indicia to the MDD 170 through the communications network 126 at step 278.

Figure 13:
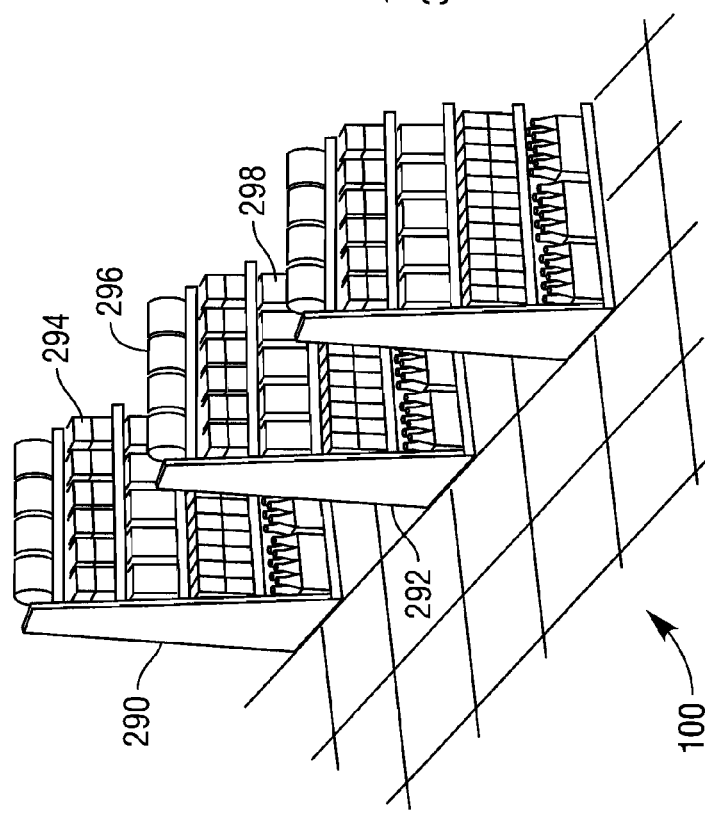
FIG. 13 depicts a user view of a portion of the store of FIG. 1 through the mobile display device of FIG. 4 when no indicia is rendered on the mobile display device.

When the communication module 198 of the MDD 170 receives the indicia rendering data, the microcontroller 204 controls the dual projectors 178 at step 280 to render the indicia on the lenses 180 and 182. The indicia are viewable to the user as an overlay of the view of the store through the lenses 180 and 182. By way of example, FIG. 13 depicts a portion of the store 100 as viewed through the lenses 180 and 182. The user can see, for example, fixtures 290 and 292 and various products 292, 296 and 298 on the fixtures 290 and 292.

Figure 14:
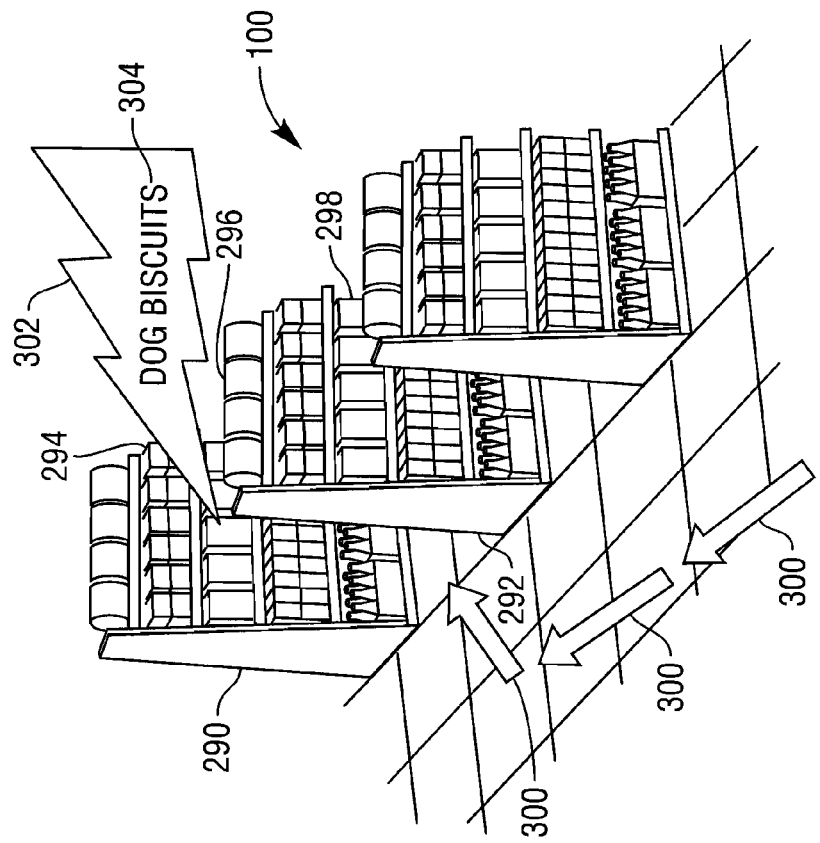
FIG. 14 depicts the user view of the portion of the store of FIG. 12 through the mobile display device of FIG. 4 when indicia are rendered on the mobile display device to augment the view of the user in accordance with principles of the invention.

FIG. 14 shows the view through the lenses 180 and 182 in response to the voice command "show dog biscuits." While the fixtures 290 and 292 and the various products 294, 296 and 298 on the fixtures 290 and 292 are still viewable, indicia 300 and 302 are also viewable. The indicia 300 show the user the route to the dog biscuits within the store 100. If desired, the indicia 300 may be used with a two dimensional model 110. The indicia 302, however, inform the user of the height above the floor at which the product is located. This information may be particularly desired for small products and/or multiple products located in tall fixtures.

Additionally, an informational message 304 is projected onto the lenses 180 and 182. The message can be used to specifically identify the product located. This information is useful when, instead of a single product, a list of products is presented to the processing circuit 106. Accordingly, the processing circuit 106 can determine the best route through the store 100 which allows the user to obtain all of the products in the list. The program instructions used to identify the best route may be based upon minimizing the time required to obtain all of the products on the provided list, maximizing the user's exposure to special product displays, or other criteria.

Returning to FIG. 12, at the step 282 the processing circuit 106 determines if the user is at the same location within the store 100 as the product. The user location for this step is the most recent location available from the process 240. If the user is at the location of the product, the process ends at step 284. If the user is not at the product location, then the process returns to the step 272 and updates the indicia rendered onto the lenses 180 and 182.

Returning to step 268, if the processing circuit 106 determines that the requested product is not available, then the process proceeds to step 310 and determines if an alternative product is available by interrogating the equivalent database 120 and the inventory database 116. By way of example, if a user requested the location of a particular brand of dog biscuits which is not in inventory, an alternative brand may be associated with either the particular brand requested or with key words within the request. Of course, this step may also be performed when the requested product is in inventory so as to offer the user a choice of products.

If an alternative product is available, the process proceeds to step 312 and the processing circuit 106 executes program instructions 124 which cause the location database 118 to be searched to ascertain the location of the alternative product identified in the equivalent database 120. The location data may be provided in two dimensional coordinates or in three dimensional coordinates.

Next, the processing circuit 106 obtains user data at step 314. The user data includes the location and orientation of the MDD 170 obtained in process 240. The user data may further include the eye orientation data obtained in process 240. If the system is limited to two dimensional coordinates, then eye orientation data is not necessary. Additionally, when using two dimensional coordinates, MDD orientation data need only be provided to the extent necessary to ascertain the direction the user is looking.

At step 316, the processing circuit 106 obtains model data from the stored model 110. Using the data obtained in steps 312, 314 and 316, the processing circuit 106 at step 318 determines the best route from the user location to the alternative product location. Additionally, the perspective of the user is determined based upon the user data from step 314. Based upon the route and perspective data, the processing circuit 106 generates indicia rendering data which may be used to render indicia onto the lenses 180 and 182 and transmits the rendering data for the indicia to the MDD 170 through the communications network 126 at step 320.

When the communication module 198 of the MDD 170 receives the indicia rendering data, the microcontroller 204 at step 322 controls the dual projectors 178 to render the indicia on the lenses 180 and 182. Additionally, an indicia 304, which may be a word or a symbol, may be used to inform the user why an alternative product has been presented. At the step 324 the processing circuit 106 determines if the user is at the same location within the store 100 as the alternative product. The user location for this step is the most recent location available from the process 240. If the user is at the location of the alternative product, the process ends at step 284. If the user is not at the product location, then the process returns to the step 314 and updates the indicia rendered onto the lenses 180 and 182.

In the event there is no alternative product identified in the equivalent database 120 or if the alternative product(s) is out of inventory, then at step 310 the process proceeds to step 326 and the processing circuit 106 generates rendering data in the form of words or symbols explaining to the user why no location data is available. For example, a message may be "not in stock," or "sold out," or "on order for delivery tomorrow," etc. The desired informational rendering data is then transmitted to the MDD 170 through the communications network 126 at step 328. When the communication module 198 of the MDD 170 receives the informational rendering data, the microcontroller 204 at step 328 controls the dual projectors 178 to render the information on the lenses 180 and 182 and the process ends at step 284.

The foregoing processes may be modified in a number of ways within the scope of the invention. By way of example, many of the steps may be performed in different sequences. Additionally, different types of information may be used in determining the route information or other information to be rendered. For example, the classification database 120 may be used to identify all products which have a low caloric value, products which do not incorporate certain allergens, or products offered particular manufacturers or producers. Accordingly, a shopper may issue a product request for a low calorie soup, a sugar free drink, a candy bar with no peanuts or an organic loaf of bread, and be provided with guidance to the desired product.

While this invention has been described as having a preferred design, the subject invention can be further modified within the spirit and scope of this disclosure. This application is therefore intended to cover any variations, uses, or adaptations of the subject invention using its general principles. Further, this application is intended to cover such departures from the present disclosure as come within known or customary practice in the art to which this invention pertains and that fall within the limits of the appended claims.

I claim:
1. An augmented reality shopping system comprising:
a store communication network;
a control system comprising:
  I/O devices;
  a memory including program instructions for:
    receiving a product location request;
    associating the received request with product information stored in a product database where the product database is located within the memory and includes product availability information;
    determining the location of the product within the store,
    receiving shopper location information;
    determining a route between the determined location of the product and the shopper location based upon the shopper location information;
    generating route rendering data based upon the determined route;
    transmitting product availability information through the store communication network; and transmitting the route rendering data through the store communication network; and a processor operably connected to the I/O devices, the store communication network and to the memory for executing the program instructions; and a hands-free mobile display device operably connected to the processor through the store communication network including a lens and a projector for rendering an overlay image on the lens using the transmitted route rendering data and the transmitted product availability information.

2. The system of claim 1, wherein:
the memory further comprises a stored model of at least a portion of the store; and
the mobile device is further operable to render an overlay image based upon the stored model.

3. The system of claim 1, wherein the network is a wireless network and the mobile display device is wirelessly integrated into the network.

4. The system of claim 1, wherein the mobile display device operates based upon voice commands.

5. The system of claim 1, wherein the mobile display device operates based upon eye tracking.

6. The system of claim 1, wherein the I/O devices include a keyboard and a pointing device.

7. An augmented reality shopping system comprising:
a store communication network;
a control system comprising:
I/O devices;
a memory including program instructions for:
receiving a product location request;
associating the received request with product information stored in a product database where the product database is located within the memory and includes alternative product availability information;
determining the location of the product within the store;
receiving shopper location information;
determining a route between the determined location of the product and the shopper location based upon the shopper location information;
generating route rendering data based upon the determined route;
transmitting alternative product availability information through the store communication network; and
transmitting the route rendering data through the store communication network; and
a processor operably connected to the I/O devices, the store communication network and to the memory for executing the program instructions; and
a hands-free mobile display device operably connected to the processor through the store communication network including a lens and a projector for rendering an overlay image on the lens using the transmitted route rendering data and the transmitted alternative product availability information.

8. A method of rendering an overlay image on a hands-free mobile display device, the method comprising:
transmitting the product location request through the hands-free mobile display device based upon voice commands to the control system;
receiving by a control system a product location request through a store communications network from the hands-free mobile display device;
associating by the control system the received request with product information stored in a product database located within the control system;
determining the location of the product within the store;
receiving by the control system shopper location information from the hands-free mobile display device;
determining by the control system a route to the determined product location from a determined shopper location based upon the shopper location information;
transmitting by the control system route rendering data through the store communication network including a wireless network to the hands-free mobile display device; and
rendering an overlay image on a lens of the hands-free mobile display device by a projector of the hands-free mobile display device using the transmitted route rendering data.

9. The method of claim 8, further comprising:
storing a model of at least a portion of the store within the control system; and wherein rendering comprises:
rendering an overlay image based upon the stored model.

10. The method of claim 8, further comprising:
transmitting by the control system product availability information through the store communication network to the hands-free mobile display device; and
rendering by the control system an overlay image using the product availability information.

11. The method of claim 8, further comprising:
transmitting by the control system alternative product availability information through the store communication network to the hands-free mobile display device; and
rendering by the control system an overlay image using the alternative product availability information.

12. A method of rendering an overlay image on a hands-free mobile display device, the method comprising:
transmitting the product location request through the hands-free mobile display device to the control system;
receiving eye tracking data from the hands-free mobile display device wherein a micro-electrical mechanical system sensor is used to track eye movement;
receiving by a control system a product location request through a store communications network from the hands-free mobile display device;
associating by the control system the received request with product information stored in a product database located within the control system;
determining the location of the product within the store;
receiving by the control system shopper location information from the hands-free mobile display device;
determining by the control system a route to the determined product location from a determined shopper location based upon the shopper location information;
transmitting by the control system route rendering data through the store communication network including a wireless network to the hands-free mobile display device; and
rendering an overlay image on a lens of the hands-free mobile display device by a projector of the hands-free mobile display device using the transmitted route rendering data.

13. The system of claim 8, wherein the hands-free mobile display device further comprises a 3-axis gyroscope operable to provide information identifying the orientation of the hands-free mobile display device.

14. The system of claim 13, wherein the hands-free mobile display device further comprises a micro-electrical mechanical system sensor operable to track the eye movement of a person wearing the hand-free mobile display device and to provide information identifying the person eye position.

15. The method of claim 12, wherein receiving shopper location information further comprises:

receiving orientation data identifying the orientation of the hands-free mobile display device wherein the orientation data is generated by a 3-axis gyroscope.

* * * * *